United States Patent
Fawthrop, III et al.

(10) Patent No.: US 8,856,016 B1
(45) Date of Patent: Oct. 7, 2014

(54) METHODS AND SYSTEMS FOR PROVIDING LIFE INSURANCE

(75) Inventors: Roland P. Fawthrop, III, Somers, CT (US); Craig Waddington, Granby, CT (US); Kevin E. Baldwin, Amston, CT (US); Jeffrey M. Dube, Cheshire, CT (US); Jerrold M. Norman, Glastonbury, CT (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 2253 days.

(21) Appl. No.: 10/431,316

(22) Filed: May 7, 2003

(51) Int. Cl.
*G06Q 40/00* (2012.01)

(52) U.S. Cl.
USPC ............................................. 705/4

(58) Field of Classification Search
USPC .............................................. 705/4, 35, 36 R
See application file for complete search history.

(56) References Cited

U.S. PATENT DOCUMENTS

| | | | | |
|---|---|---|---|---|
| 4,839,804 A | * | 6/1989 | Roberts et al. | 705/36 R |
| 5,655,085 A | * | 8/1997 | Ryan et al. | 705/4 |
| 5,752,236 A | | 5/1998 | Sexton et al. | |
| 5,754,980 A | | 5/1998 | Anderson et al. | |
| 5,974,390 A | | 10/1999 | Ross | |
| 6,076,072 A | * | 6/2000 | Libman | 705/36 R |
| 6,330,541 B1 | * | 12/2001 | Meyer et al. | 705/36 R |
| 6,343,272 B1 | * | 1/2002 | Payne et al. | 705/4 |
| 6,963,852 B2 | * | 11/2005 | Koresko | 705/35 |
| 7,698,158 B1 | * | 4/2010 | Flagg | 705/4 |
| 2001/0014873 A1 | * | 8/2001 | Henderson et al. | 705/35 |
| 2002/0198802 A1 | * | 12/2002 | Koresko | 705/35 |
| 2003/0191672 A1 | * | 10/2003 | Kendall et al. | 705/4 |
| 2004/0030589 A1 | * | 2/2004 | Leisher et al. | 705/4 |

OTHER PUBLICATIONS www.wikipedia.com; description of "variable universal life insurance".*
Mass Mutual, VUL Guard: Variable Universal Life Insurance Product Prospectus Effective Apr. 7, 2003.
Mass Mutual, VUL Guard: Issued by Massachusetts Mutual Life Insurance Company, Massachusetts Mutual Variable Life Separate Account I.

* cited by examiner

*Primary Examiner* — Greg Pollock
(74) *Attorney, Agent, or Firm* — Mintz Levin Cohn Ferris Glovsky and Popeo, P.C.

(57) ABSTRACT

Life insurance methods, systems and products are provided that incorporate a fixed account, a separate account, and under specified circumstances a death benefit. One embodiment of a method for providing life insurance policy includes: providing a fixed account for receiving a portion of premiums allocated to the fixed account and providing a separate account for receiving a portion of premiums allocated to the separate account. The separate account allows a policy owner to manage investments in a plurality of investment options. If the policy meets a safety test, the method guarantees the death benefit without withdrawing more than a specified percentage of specified charges from the separate account to fund the guaranteed death benefit.

19 Claims, 4 Drawing Sheets

METHODS AND SYSTEMS FOR PROVIDING LIFE INSURANCE

BACKGROUND OF THE INVENTION

The present invention relates to life insurance policies and, more specifically, to life insurance methods, systems and products that incorporate a fixed account, a separate account, and under specified circumstances provide a death benefit, e.g., a guaranteed death benefit.

Current insurance products have certain drawbacks. Term life insurance has a limited guarantee period and does not provide cash accumulation. Whole life has a relatively high premium and does not provide investment choices for value in its savings component. Universal life also does not provide investment choices for value in its savings component. Variable universal life typically has limited death benefit guarantees and extracts a relatively high cost for the guarantees.

Expanding on this last point, because a policyholder can put the money necessary to satisfy the death benefit guarantee in any investment account, including the most aggressive and risky, the premium required to guarantee that the policy will not lapse is relatively high. In other words, because an insurance company needs to ensure that a policy holder's account has a specified account value to cover the cost of the insurance, if the policy holder is able to indiscriminately put the account value of the policy into risky investments, the insurance company will, in turn, need to require that the policy holder pay correspondingly higher premiums to ensure that policy will have the specified account value. Thus, a need exists for methods, systems and products for providing life insurance that do not suffer from the above-mentioned drawbacks.

SUMMARY OF THE INVENTION

The present invention addresses and resolves each of the drawbacks noted above. The present invention relates to life insurance methods, systems and products that incorporate a fixed account, a separate account, and under specified circumstances a death benefit.

One embodiment of a method according to the invention provides a life insurance policy. The method includes providing a fixed account for receiving a portion of premiums needed to fund a guaranteed death benefit, and providing a separate account to receive a portion of premiums allocated to fund investment opportunities. The separate account allows a policy owner to manage investments in a broad portfolio of investment options. If the policy meets a safety test, the method not only guarantees a death benefit but also guarantees that the insurance charges associated with the guaranteed death benefit will be deducted from the fixed account rather than from the separate accounts. Insurance charges will not be taken from the separate accounts even if the value of the fixed account is not large enough to pay for the insurance charges. The method permits the selection of four death benefit options, including a new death benefit option that provides for the payment of the face amount of the policy plus the value of the separate accounts.

BRIEF DESCRIPTION OF THE ILLUSTRATED EMBODIMENTS

DETAILED DESCRIPTION OF THE INVENTION

The present invention relates to life insurance methods, systems and products that incorporate a fixed account, a separate account, and under specified circumstances a death benefit, e.g., a guaranteed death benefit. More specifically, one embodiment of the invention is a method for providing a life insurance policy. The method includes providing a fixed account for receiving a portion of premiums allocated to the fixed account and providing a separate account for receiving a portion of premiums allocated to the separate account. The separate account allows a policy owner to manage investments in a plurality of investment options. If the policy meets a safety test, the method guarantees the death benefit without withdrawing a specified amount or percentage, e.g., zero percent, of the insurance and policy charges from the separate account to fund the guaranteed death benefit.

Figure 1:
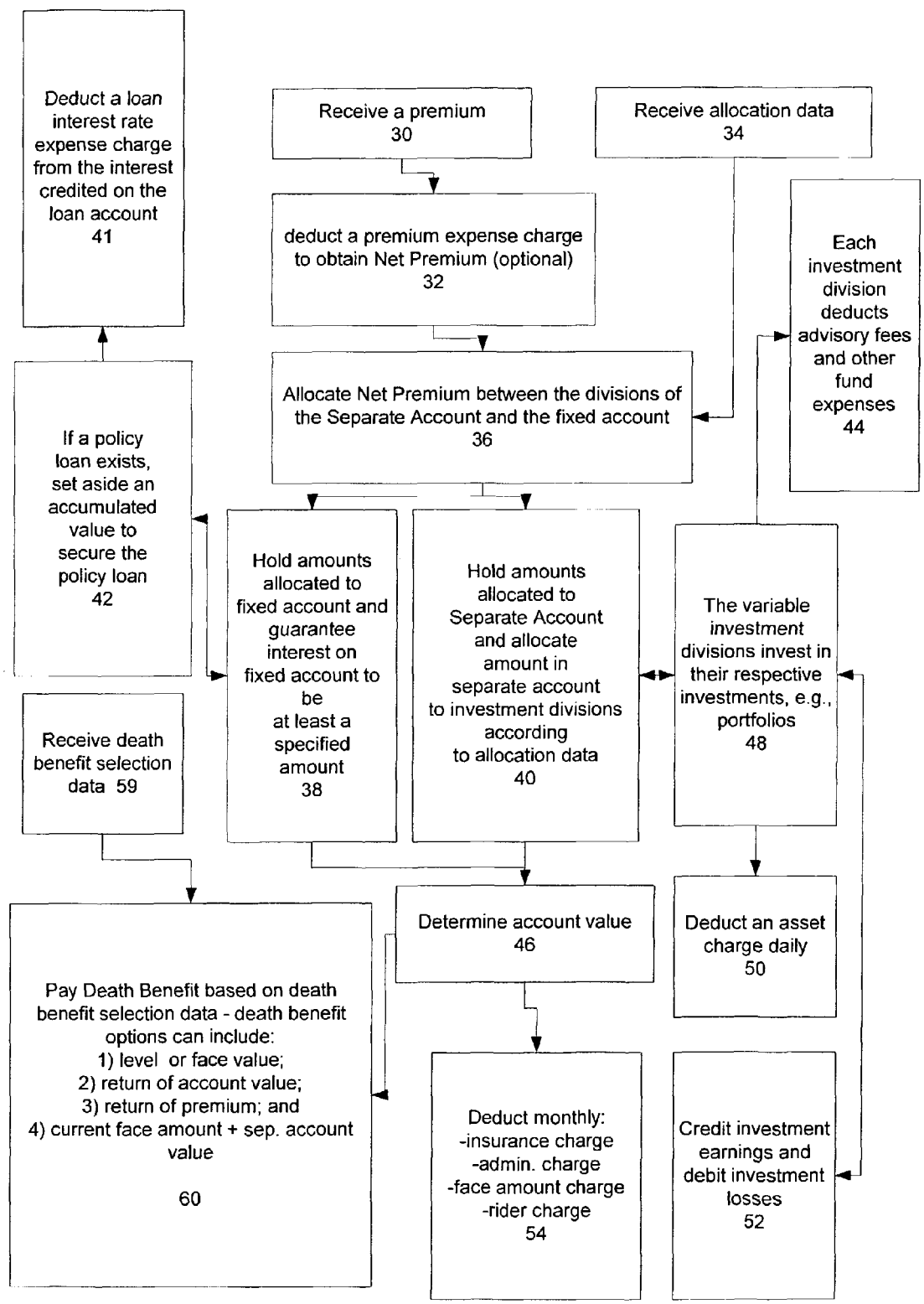
FIG. 1 is a flow chart illustrating how an insurance policy according to one embodiment of the invention processes premium payments.

With reference to FIG. 1, an insurance policy administration system according to one embodiment of the invention processes premiums for the policy. One can implement such an administration system on a data processing system such as the one illustrated in FIG. 4. The administration system receives 30 notice of receipt of a premium. The system deducts 32 a premium expense charge to obtain a net premium. The system receives 34 allocation data from a policy owner regarding how the policy owner wants the premium allocated between the divisions of the separate account and the fixed account. The policy owner typically provides the allocation data when applying for the policy. Based on the allocation data, the system allocates 36 the net premium between the fixed account and the divisions of the separate account.

The system holds 38 amounts allocated to the fixed account and guarantees the interest rate on the amount in the fixed account to be at least a specified rate such as between about 1% and about 6%, e.g., 3%. If a policy loan exists, the system sets aside 42 an accumulated value from the fixed account to secure the policy loan. Furthermore, the system deducts 41 a loan interest rate expense charge from the interest credited on the loan account.

The system also holds 40 amounts allocated to the separate account and allocates those amounts to divisions of the separate account according to the allocation data provided by the policy owner. Each variable investment division in turn invests 48 its allocated amount in its respective investments, e.g., in its portfolio if the investment division is a mutual fund manager. Each investment division deducts 44 advisory fees and other fund expenses from the separate account. The administration system also deducts 50 an asset charge periodically, e.g., daily. Furthermore, the system credits 52 investment earnings to, and deducts investment losses from, the separate account.

The system can determine 46 a total account value. This total account value can be used by the system to determine the death benefit depending on the death benefit selected by the policy owner. One embodiment of a policy according to the invention allows a policy owner to choose from the following four death benefit options: 1) level option—the current face amount; 2) return of account value option—the current face amount plus the account value of the policy; 3) return of premium option—the current face amount plus the total of the premiums that were paid, less any premiums refunded; and 4) the current face amount plus the separate account value. Each of these death benefit options provides the above-described values less any outstanding debt. The following table illustrates an example determination of a death benefit for each of the death benefit options outlined above and for a policy having a face amount of $100,000, a fixed account value of 10,000, a separate account value of 5,000, a sum of premiums paid of $6,000, and no outstanding debt.

| Death Benefit Option | Face Amount | Fixed Account Value | Sep. Account Value | Sum of Premiums Paid | Death Benefit |
| --- | --- | --- | --- | --- | --- |
| 1) level | 100,000 | 10,000 | 5,000 | 6,000 | 100,000 |
| 2) return of account value | 100,000 | 10,000 | 5,000 | 6,000 | 115,000 |
| 3) return of premium | 100,000 | 10,000 | 5,000 | 6,000 | 106,000 |
| 4) current face amount + separate account value | 100,000 | 10,000 | 5,000 | 6,000 | 105,000 |

Thus, the system receives 59 death benefit selection data regarding which death benefit the policy owner has selected. The policy owner typically provides the death benefit selection data when applying for the policy. Although in one embodiment of the invention the policy owner can change his or her death benefit selection. The system then pays 60 the death benefit based on the death benefit selection data. For example, if a policy owner selects the death benefit option that provides the current face amount plus the separate account value, the system determines the separate account value and upon the death of the insured pays 60 the death benefit. The death benefit in this case equals the current face amount of the policy plus the separate account value less any outstanding debt.

The administration system makes certain other deductions from the account value. The system deducts 54 periodically, e.g., monthly, insurance charges, an administration charge, a face amount charge, and any applicable rider charges. In one embodiment, if the policy passes a safety test (to be explained in detail below, with reference to FIG. 3), then the policy guarantees the death benefit without withdrawing the insurance and policy charges from the separate account. Thus, for example, if on a monthly assessment date the policy passes the safety test but the fixed account only has a balance of $20 and there is a $300 insurance charge due, the death benefit remains in force and the policy does not assess the insurance charge to the separate account.

Figure 2:
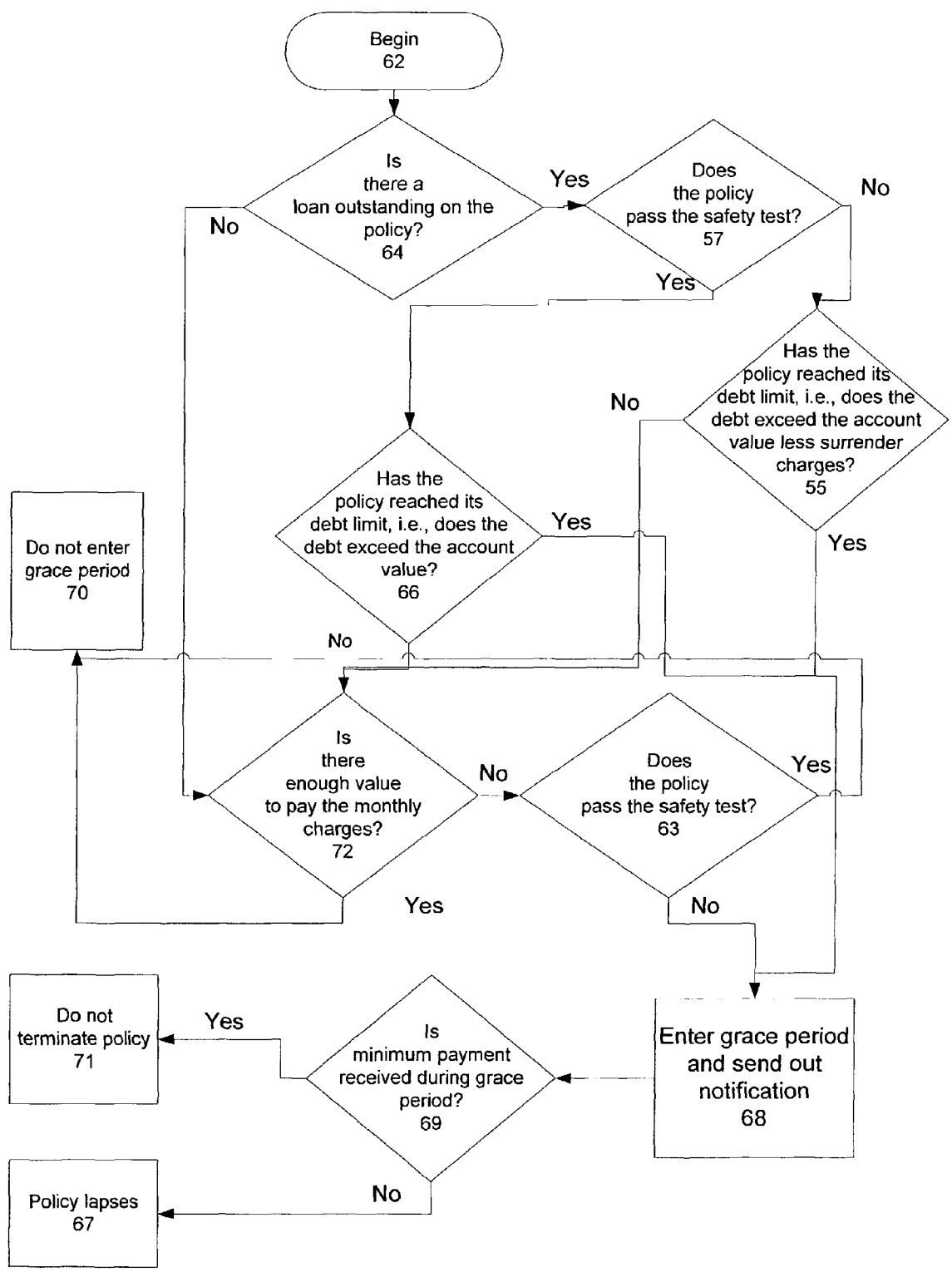
FIG. 2 is a flow chart of one embodiment of a policy termination test for the policy associated with FIG. 1.

In one embodiment, an administration system, i.e., a data processing system, periodically, e.g., monthly, performs a termination test on each policy. With reference to FIG. 2, the system begins 62 the termination test by determining 64 if there is a loan outstanding on the policy. If there is, the system determines 57 if the policy passes a safety test. If the policy passes the safety test, the system determines if the policy has reached its debt limit by determining 66 if the debt limit exceeds the account value. If the policy does not pass the safety test, the system determines if the policy has reached its debt limit by determining 55 if the debt limit exceeds the account value less surrender charges. If the policy has reached its debt limit the policy enters 68 a grace period and the system sends out notification to the policy owner that the policy has entered the grace period and will terminate if a minimum payment is not received during the grace period.

If there is no loan outstanding on the policy or if the policy has not reached its debt limit, the system determines 72 if there is enough value in the total account to pay the monthly charges. If there is not enough value to pay the monthly charges, the system determines 63 if the policy passes the safety test. If it does not pass the safety test, then the policy enters 68 a grace period and the system sends out notification to the policy owner. Conversely, if the policy does pass the safety test or if there is enough value to pay the monthly charges, the policy does not enter 70 a grace period.

Figure 3:
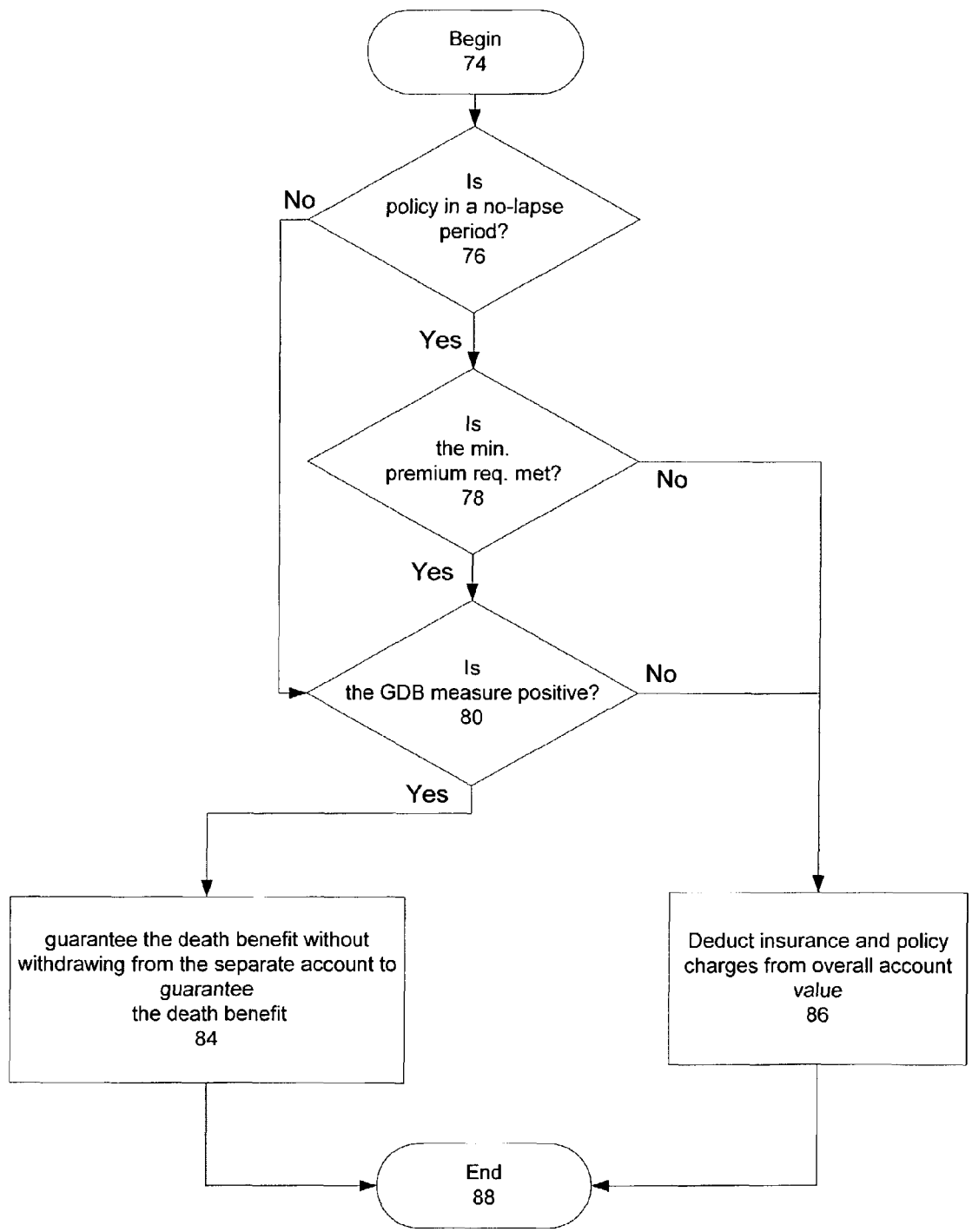
FIG. 3 is a flow chart of one embodiment of a process for administering a safety test for the policy associated with FIG. 1.

With reference to FIG. 3, one embodiment of the safety test referred to in the description of the termination test begins 74 with determining 76 if the policy is in a no-lapse period. The no lapse period can take a variety of forms including the earlier of: 1) twenty years from inception of the policy or 2) the date that the insured attains the age of ninety. If the policy is in a no lapse period, the test determines if the policy meets a minimum premium requirement. In one embodiment the policy meets the minimum premium requirement if the accumulation at a specified interest of all the premiums paid into the policy since inception, less withdrawals, and less any policy debt is greater than or equal to the accumulation at the specified interest rate of all the minimum premiums.

If the policy does not meet the minimum premium test, the policy fails the safety test. If the policy is not in the no-lapse period or if the policy meets the minimum premium test, the test determines 80 if the policy has a guaranteed death benefit (GDB) measure that is positive. In one embodiment the administration system determines the GDB measure by crediting premiums paid, crediting an interest rate (set at issue) on the premiums paid and subtracting insurance charges (also set at issue). In other words, the GDB measure is a clone of the fixed account where the system credits the GDB measure with the interest rate set at issue and takes monthly policy charges set at issue. Thus, a difference between the fixed account value and the GDB measure is that the credited interest rates and policy charges for the GDB measure are set at issue. For the fixed account, the interest rate and policy charges may vary.

If the GDB measure is not positive, the policy fails the safety test. If the GDB measure is positive, the policy passes the safety test. In one embodiment, if a policy passes the termination test and the safety test, the system guarantees 84 a selected death benefit without withdrawing specified charges, e.g., insurance and policy charges, from the separate account to guarantee the death benefit. However, if the policy passes the termination test but does not pass the safety test, the system deducts 86 insurance and policy charges from the overall/total account value.

Returning to FIG. 2, once the policy enters a grace period, the system determines 69 if the system receives notice of a minimum payment during the grace period. If it does receive such notice during the grace period, the system does not terminate 71 the policy, i.e., the system removes the policy from the grace period. If the system does not receive such notice by the end of the grace period, the policy lapses 67 at the end of the grace period.

The invention contemplates various other embodiments for the safety test. For example, the safety test could test merely whether the policy meets a minimum premium requirement for the life of the policy or for a specified duration. Alternatively, the safety test could test merely whether the policy has a positive GDB measure. In yet another embodiment of the safety test, the policy could include a rider with an associated charge such that if the policy owner pays the charge associated with the rider then the policy is guaranteed not to lapse. In other words, according to this embodiment, merely determining that the policy owner, or the owner's agent, has paid the charges required with the rider satisfies the safety test.

Furthermore, according to an alternative embodiment of the invention, if a policy passes the termination test and the safety test, the administration system guarantees a selected death benefit without withdrawing more than a specified amount or percentage, e.g., between about 0% and about 50%, of the insurance and policy charges from the separate account to guarantee the death benefit.

In yet another embodiment, the system may decouple the termination test and the safety test. In other words, the system may perform the safety test alone at a different time from the performance of the termination test in order to determine whether to guarantee the death benefit without withdrawing from the insurance and policy charges from the separate account to guarantee the death benefit.

Figure 4:
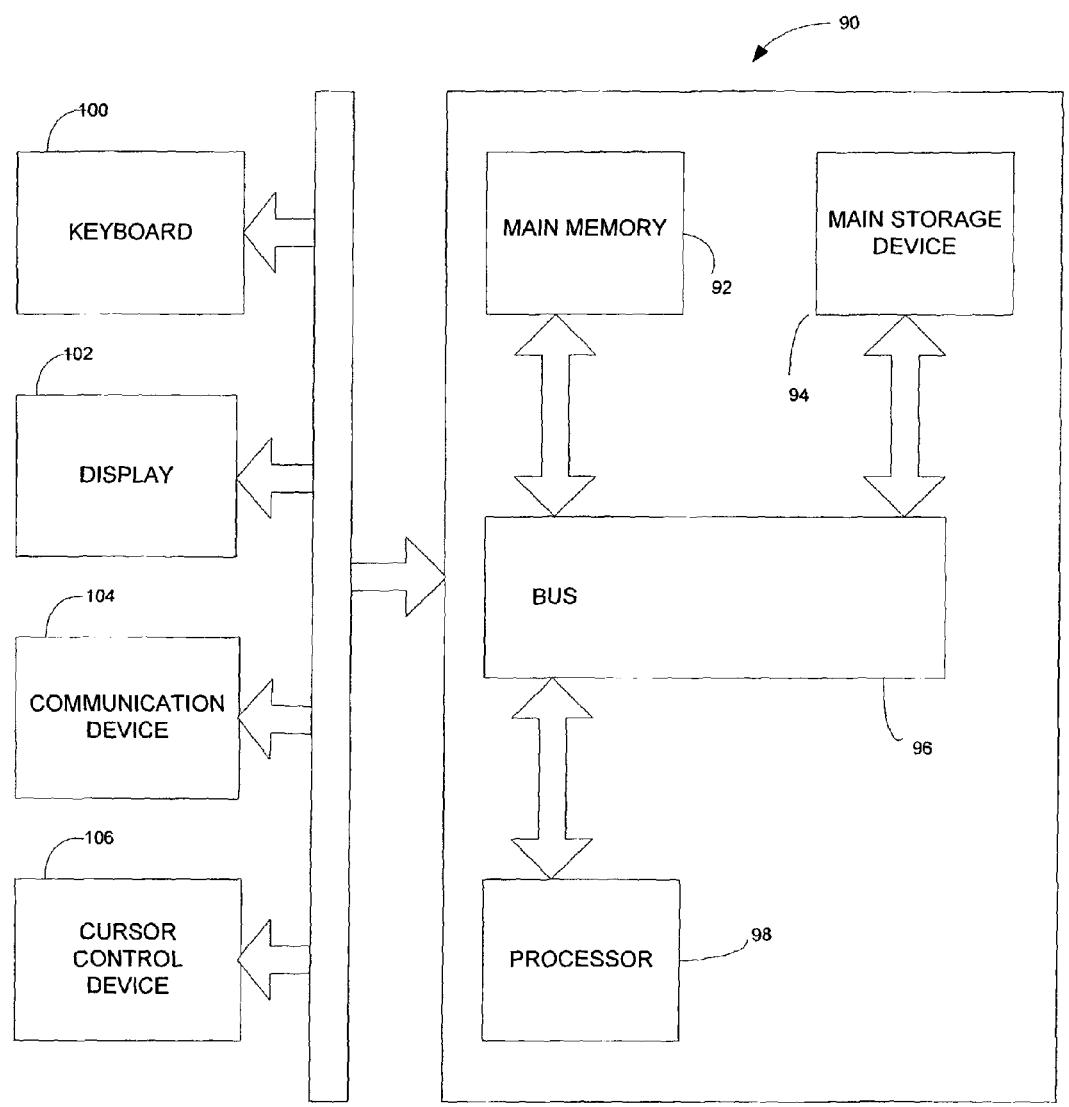
FIG. 4 is a block diagram of one embodiment of a data processing computer system which can be used for implementing the process of FIG. 1, the termination test of FIG. 2, and/or the safety test of FIG. 3.

With reference to FIG. 4, a data processing system 90 that can implement features of the present invention includes a bus or other communication means 96 for communicating information between components of the system. The system 90 further includes a processor 98 coupled to the bus 96 and a main memory, e.g., a random access memory (RAM) or other dynamic storage device 92, also coupled to the bus. The RAM stores instructions for execution by the processor 98. The main memory can also store temporary variables. The system 90 can include a mass storage device 94 coupled to the bus 96 for storing information that is not accessed as regularly as information stored in RAM.

System 90 can include a display 102 for displaying information such as information regarding the administration of one or more policies according to the invention. The system can include input devices such as a cursor control device 106 and a keyboard 100 for allowing a user to input data.

The system 90 can also include a communication device 104. If the system 90 is implementing one portion of one embodiment of the invention, then the communication device 104 allows the system to communicate with other portions of the system. The communication device 104 can include a network card, an RF transceiver, or other well-known communication device for coupling to a network. The data processing system 90 can implement the premium payment process of FIG. 1, the termination test of FIG. 2 and/or the safety test of FIG. 3 as well other administration tasks involved in administering a life insurance policy according to the invention.

Having thus described at least one illustrative embodiment of the invention, various alterations, modifications and improvements are contemplated by the invention including the following: the policy can employ a variety of no-lapse periods and debt limit definitions; the policy may provide a variety of death benefits choices; the separate account of the policy can provide a variety of investment choices; there can be a variation in the types of fees deducted from the policy; and the specified charges that the system will not withdraw from the separate account if the safety test is met can include a variety of charges such as insurance charges, policy charges, and a combination of insurance and policy charges. Such alterations, modifications and improvements are intended to be within the scope and spirit of the invention. Accordingly, the foregoing description is by way of example only and is not intended as limiting. The invention's limit is defined only in the following claims and the equivalents thereto.

What is claimed is:

1. A computer-implemented method for providing a life insurance policy, the method comprising:
    storing by computer memory death benefit data identifying a death benefit provided in exchange for recurring charges associated with the death benefit, wherein the death benefit provides for a payout upon death of a party covered by the life insurance policy;
    storing by the computer memory allocation data identifying a portion of premiums to allocate to a fixed account associated with the life insurance policy, wherein a rate of return on the fixed account is guaranteed to never be less than a specified rate;
    storing by the computer memory allocation data identifying a portion of premiums to allocate to a separate account, wherein the separate account allows a policy owner to manage investments in one or more investment options and wherein a rate of return on the separate account depends on performance of the one or more investment options selected by the policy owner;
    upon receipt of a premium associated with the life insurance policy, allocating by a data processor executing computer program instruction a portion of the premium to the fixed account that is identified by the allocation data for the fixed account and a portion of the premium to the separate account that is identified by the allocation data for the separate account; and
    upon occurrence of a charge associated with the death benefit on the life insurance policy:
    determining by the data processor whether a value of the fixed account is has sufficient funds to cover the charge associated with the death benefit;
    determining by the data processor whether the life insurance policy meets a safety test, where determining whether the life insurance policy meets the safety test comprises confirming by the data processor that: during a no-lapse period, a minimum premium requirement is met; and a guaranteed death benefit (GDB) measure is positive; and
    when the value of the fixed account does not have sufficient funds to cover the charge associated with the death benefit, and when the policy meets the safety test, maintaining the life insurance policy in force by the data processor and guaranteeing the death benefit without withdrawing more than a specified percentage of the charge from the separate account to fund the guaranteed death benefit, wherein the specified percentage is less than 50%, wherein a monetary value of the separate account does not affect the maintaining of the life insurance policy in force and the guaranteeing of the death benefit.

2. The method of claim 1 wherein the charge includes at least one of an insurance charge and a policy charge.

3. The method of claim 1 wherein the specified percentage is zero.

4. The method of claim 1 wherein the account value in the fixed account is credited with current market interest rates, guaranteed to never be less than a specified value.

5. The method of claim 4 wherein the specified value is between 1% and 6%.

6. The method of claim 1 wherein the policy has a set of minimum premiums and wherein the minimum premium requirement is met if the data processor determines that the accumulation at a specified interest of all premiums paid into the policy since inception, less withdrawals, and less any policy debt is greater than or equal to the accumulation at the specified interest rate of all the minimum premiums.

7. The method of claim 1 wherein the no-lapse period is the shorter of the first 20 policy years and the time for the insured to reach an age of 90.

8. The method of claim 1 wherein the GDB measure is determined by the data processor by crediting premiums paid in, crediting an interest rate set at issue on the premiums paid and subtracting insurance charges set at issue.

9. The method of claim 1 wherein, upon the death of the party covered by the life insurance policy, determining by the processor the death benefit as the sum of the current face amount and the value of the separate account.

10. The method of claim 1 wherein determining whether the life insurance policy meets the safety test comprises confirming by the data processor that the guaranteed death benefit (GDB) measure, which is determined by crediting premiums paid in to the fixed account, crediting an interest rate set at issue on the premiums paid and subtracting insurance charges set at issue, is greater than a specified value.

11. The method of claim 1 wherein determining whether the life insurance policy meets the safety test comprises confirming by the data processor that the minimum premium requirement is met, wherein the policy has a set of minimum premiums and wherein the minimum premium requirement is met if the data processor determines that the accumulation at a specified interest of all premiums paid into the policy for a specified time period, less withdrawals, and less any policy debt is greater than or equal to the accumulation at the specified interest rate of all the minimum premiums.

12. A system for providing a life insurance policy, the system comprising:
   a data processor executing computer program instructions stored in computer memory, which when executed are configured to:
   store death benefit data identifying a death benefit provided in exchange for recurring charges associated with the death benefit, wherein the death benefit provides for a payout upon death of a party covered by the life insurance policy;
   store allocation data identifying a portion of premiums to allocate to a fixed account associated with the life insurance policy, wherein a rate of return on the fixed account is guaranteed to never be less than a specified rate; and
   store allocation data identifying a portion of premiums to allocate to a separate account, wherein the separate account allows a policy owner to manage investments in one or more investment options and wherein a rate of return on the separate account depends on performance of the one or more investment options selected by the policy owner;
   process data regarding a received premium, to allocate to the fixed account a portion of the received premium that is identified by the allocation data for the fixed account, and to allocate a portion of the received premium to the separate account that is identified by the allocation data for the separate account; and
   determine, upon occurrence of a charge associated with the death benefit on the life insurance policy, whether a value of the fixed account has sufficient funds to cover the charge associated with the death benefit;
   determine whether the life insurance policy meets a safety test, where determining whether the life insurance policy meets the safety test comprises confirming by the data processor that: during a no-lapse period, a minimum premium requirement is met; and a guaranteed death benefit (GDB) measure is positive; and
   when the value of the fixed account does not have sufficient funds to cover the charge associated with the death benefit, and when the policy meets the safety test, maintain the life insurance policy in force and guarantee the death benefit without withdrawing the charge from the separate account to fund the guaranteed death benefit, wherein a monetary value of the separate account does not affect the maintaining of the life insurance policy in force and the guaranteeing of the death benefit.

13. The system of claim 12 wherein the death benefit for the policy is the sum of a current face amount and a value of the separate account.

14. The system of claim 12 wherein the data processor configured to determine whether the life insurance policy meets the safety test is configured to confirm that the guaranteed death benefit (GDB) measure, which is determined by crediting premiums paid into the fixed account, crediting an interest rate set at issue on the premiums paid and subtracting insurance charges set at issue, is greater than a specified value.

15. The system of claim 12 wherein the data processor configured to determine whether the life insurance policy meets the safety test is configured to confirm that the minimum premium requirement is met, wherein the policy has a set of minimum premiums and wherein the minimum premium requirement is met if the accumulation at a specified interest of all premiums paid into the policy for a specified time period, less withdrawals, and less any policy debt is greater than or equal to the accumulation at the specified interest rate of all the minimum premiums.

16. A non-transitory computer readable storage medium encoded with processing instructions for directing a computer to:
   store death benefit data identifying a death benefit provided in exchange for recurring charges associated with the death benefit, wherein the death benefit provides for a payout upon death of a party covered by the life insurance policy;
   store allocation data identifying a portion of premiums to allocate to a fixed account associated with the life insurance policy, wherein a rate of return on the fixed account is guaranteed to never be less than a specified rate;
   store allocation data identifying a portion of premiums to allocate to a separate account, wherein the separate account allows a policy owner to manage investments in one or more investment options and wherein a rate of return on the separate account depends on performance of the one or more investment options selected by the policy owner;
   upon receipt of a premium associated with the life insurance policy, allocate a portion of the premium to the fixed account that is identified by the allocation data for the fixed account and a portion of the premium to the separate account that is identified by the allocation data for the separate account; and
   upon occurrence of a charge associated with the death benefit on the life insurance policy:
   determine whether a value of the fixed account has sufficient funds to cover the charge associated with the death benefit;
   determine whether the life insurance policy meets a safety test, where determining whether the life insurance policy meets the safety test comprises confirming by the data processor that: during a no-lapse period, a minimum premium requirement is met; and a guaranteed death benefit (GDB) measure is positive; and
   when the value of the fixed account does not have sufficient funds to cover the charge associated with the death benefit, and when the policy meets the safety test, maintain the life insurance policy in force and guarantee the death benefit without withdrawing more than a specified percentage of the charge from the separate account to fund the guaranteed death benefit, wherein the specified percentage is less than 50%, wherein a monetary value of the separate account does not affect the maintaining of the life insurance policy in force and the guaranteeing of the death benefit.

17. The non-transitory computer readable storage medium of claim 16 further encoded with processing instructions for directing the computer to, upon the death of the party covered by the life insurance policy, determine the death benefit as the sum of the current face amount and the value of the separate account.

18. The non-transitory computer readable storage medium of claim 16 wherein the processing instructions for directing the computer to determine whether the life insurance policy meets the safety test comprise instructions for directing the computer to confirm that the guaranteed death benefit (GDB) measure, which is determined by crediting premiums paid in to the fixed account, crediting an interest rate set at issue on the premiums paid and subtracting insurance charges set at issue, is greater than a specified value.

19. The non-transitory computer readable storage medium of claim 16 wherein the processing instructions for directing the computer to determine whether the life insurance policy meets the safety test comprise instructions for directing the computer to confirm that the minimum premium requirement is met, wherein the policy has a set of minimum premiums and wherein the minimum premium requirement is met if the computer determines that the accumulation at a specified interest of all premiums paid into the policy for a specified time period, less withdrawals, and less any policy debt is greater than or equal to the accumulation at the specified interest rate of all the minimum premiums.

* * * * *